United States Patent
Byrne

(10) Patent No.: US 6,724,950 B2
(45) Date of Patent: Apr. 20, 2004

(54) ELECTRO-OPTICALLY TUNABLE FILTER WITH MESH STRUCTURE TO FILTER OPTICAL SIGNAL

(75) Inventor: Dale M. Byrne, Dallas, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 275 days.

(21) Appl. No.: 09/822,752

(22) Filed: Mar. 30, 2001

(65) Prior Publication Data

US 2002/0009251 A1 Jan. 24, 2002

Related U.S. Application Data

(60) Provisional application No. 60/194,064, filed on Mar. 31, 2000.

(51) Int. Cl.[7] .................. G02F 1/035; G02F 1/03; G02F 1/07
(52) U.S. Cl. .................. 385/2; 359/254
(58) Field of Search .............. 385/2; 359/245, 359/246, 247, 250, 254, 256

(56) References Cited

U.S. PATENT DOCUMENTS

| | | | |
|---|---|---|---|
| 2,591,701 A | * 4/1952 | Jaffe .................. | 359/256 |
| 4,197,008 A | 4/1980 | Pinnow et al. .......... | 356/150 |
| 4,269,481 A | 5/1981 | Yeh et al. ............. | 350/356 |
| 4,852,108 A | 7/1989 | Utaka et al. ........... | 372/20 |
| 5,065,453 A | 11/1991 | Thomas ................. | 455/286 |
| 5,434,943 A | 7/1995 | Dentai et al. .......... | 385/129 |
| 5,657,406 A | 8/1997 | Ball ................... | 385/24 |

* cited by examiner

Primary Examiner—Walter E. Snow
(74) Attorney, Agent, or Firm—Gardere Wynne Sewell LLP

(57) ABSTRACT

The present invention provides configurations for an electro-optically tunable filter. The filter includes an electro-optical crystal, at least one electrically conductive mesh screen, at least one electrode and a voltage source. In one embodiment, an electrical voltage passes from a source to a mesh screen contacting the crystal, through the crystal and an electrode on the crystal's opposite end. The mesh screen creates a narrow bandpass. The optical properties of the mesh screen-crystal combination are determined partially by the refractive index of the crystal when a voltage is applied to the mesh screen. Variable voltages change the refractive index of the crystal, creating varying spectral positions of the filter. Application of a voltage between the mesh screen and the electrode creates a field internal to the crystal that changes its refractive index, allowing it to be tunable in the bandpass location thereby affecting a passing light signal.

21 Claims, 4 Drawing Sheets

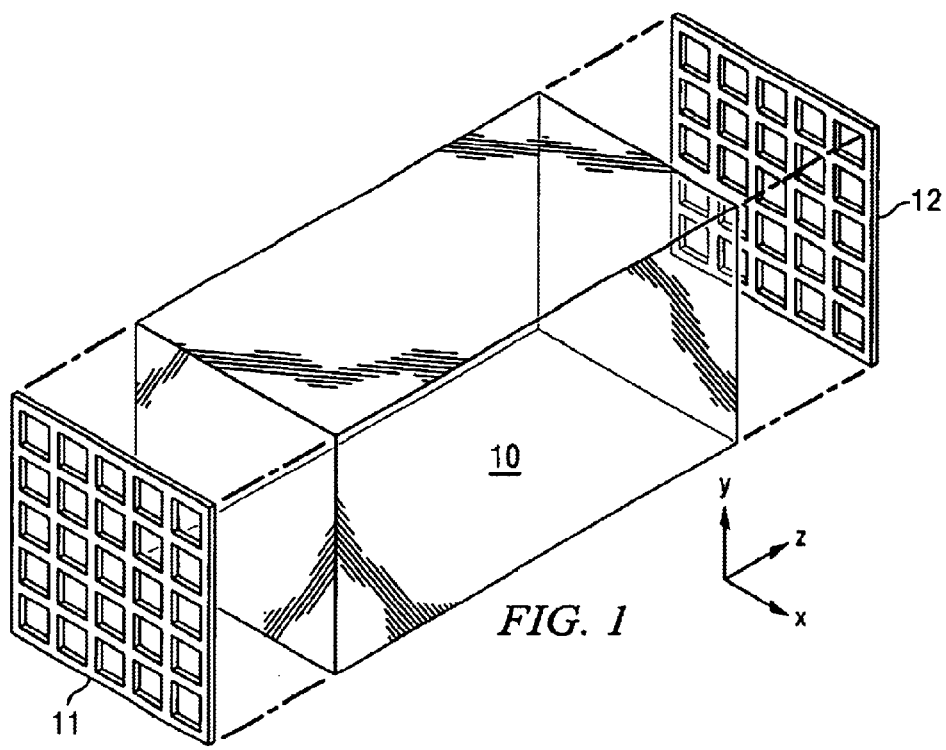
FIG. 1
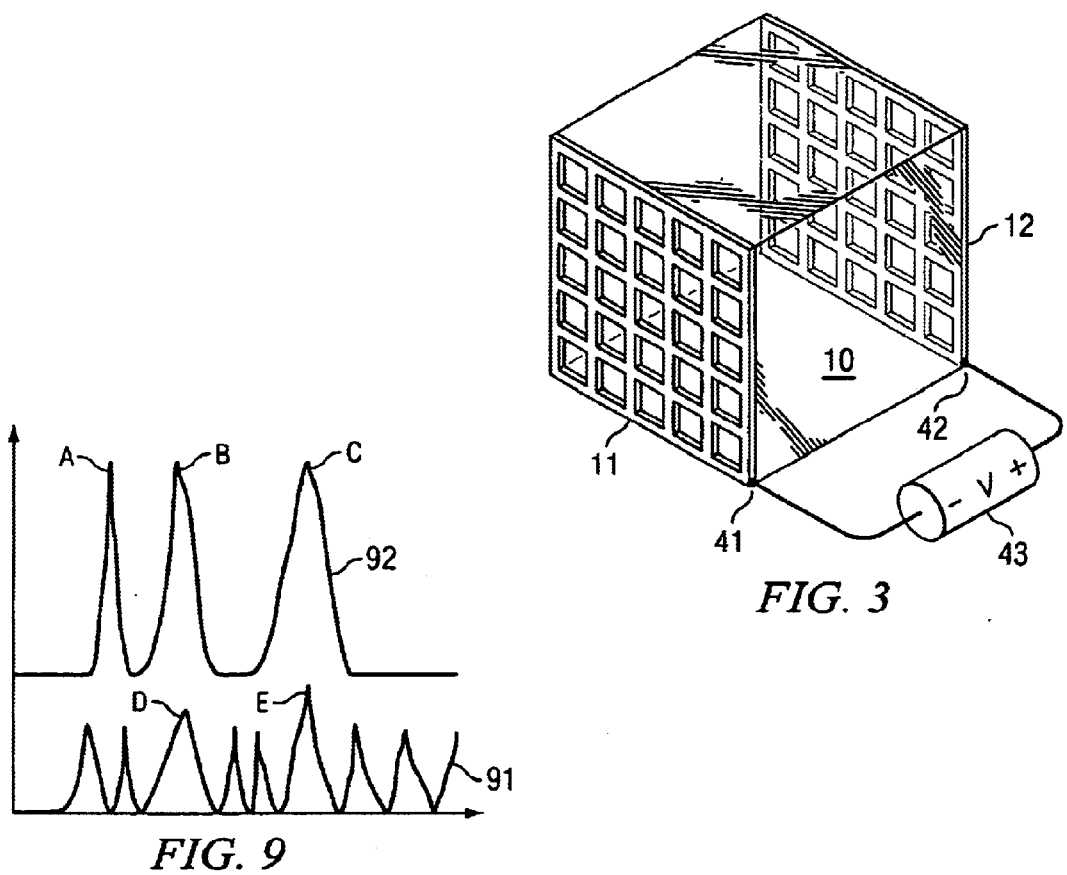
FIG. 3
FIG. 9

ELECTRO-OPTICALLY TUNABLE FILTER WITH MESH STRUCTURE TO FILTER OPTICAL SIGNAL

This application is a conversion from the claims priority of U.S. Provisional Application No. 60/194,064, filed Mar. 31, 2000.

FIELD OF THE INVENTION

The present invention relates generally to the field of optical filtering and, in particular, to an electro-optically tunable filter for the spectral filtering of light and/or optical radiation.

BACKGROUND OF THE INVENTION

Filtering optical radiation has been important for many applications such as identifying chemicals or determining properties of materials. Early filtering was done by a prism. Light would pass through a prism and be disbursed into wavelengths or into a range of wavelengths, and then a certain light wavelength or range of wavelengths were allowed to pass through an aperture for detection. A spectral filter in this configuration was generally referred to as a spectrometer. As technology progressed, diffraction gratings were used to produce a select spectrum of light through the defraction grating as opposed to a prism. In either filtering case, the range of wavelengths being detected could be tuned by rotating the prism or, in the case of a defraction grating, rotating the detraction grating.

As the electronics industry progressed, the ability to control or tune apertures without the use of mechanical means became more desirable because it could be faster. Mechanical means involve moving parts and require more time to move parts (e.g., gratings). Furthermore, space is typically a consideration in certain applications where space is limited. Systems can be designed into smaller confines if mechanical movement is minimized.

In certain applications, it is desirous to use components that are more reliable, robust, and require minimal space. For example, in the space industry wherein satellites are launched into orbit for purposes of performing tests, components must endure stress and vibration, take less space, and provide accuracy.

Accordingly, there is a need for an optical filter that is tunable without moving parts. Such a filter would be space-efficient, robust and more accurate than mechanically tunable filters.

SUMMARY OF THE INVENTION

The present invention provides an electro-optically tunable filter for the spectral filtering of light and/or optical radiation.

One embodiment of the present invention includes an electro-optical crystal having diametrically opposed input and output portions. The crystal changes its refractive index when an electric field is applied to it. An electrically conductive mesh filter covers and is in electrical contact with the input portion of the crystal. An electrode covers and is in electrical contact with the output portion of the crystal. The electrically conductive mesh filter creates a narrow bandpass and carries electrical voltage to the crystal. The electrical voltage exits the crystal and passes through the electrode to a voltage source.

The mesh filter represents small-scaled window screens. When the mesh filter is placed on the crystal, the optical properties of the combination are determined partially by the refractive index of the crystal once a voltage is applied to the mesh screen. The refractive index of the crystal can be changed with the application of variable voltages, thereby creating varying spectral positions through the filter. Thin film coatings will be applied to the crystal.

Use of the filter will entail providing a light source that will travel through the mesh filter into the electro-optic crystal and will exit the crystal. Application of a voltage between the mesh filter and the electrode creates a field internal to the electro optic crystal that will change the refractive index of it and hence allow it to be tunable in the bandpass location.

A second embodiment of the present invention includes an electro-optical crystal having diametrically opposed input and output portions. The crystal changes its refractive index when an electric field is applied to it. A first electrically conductive mesh filter covers and is in electrical contact with the input portion of the crystal. An electrode covers and is in electrical contact with the output portion of the crystal. A second electrically conductive mesh filter covers, but does not contact, the electrode. The first electrically conductive mesh filter creates a narrow bandpass and carries electrical voltage to the crystal. The electrical voltage exits the crystal and passes through the electrode to a voltage source. The addition of the second electrically conductive mesh filter results in the emission of light pulses when a variable voltage is applied to a voltage source.

A third embodiment of the present invention includes an electro-optical crystal having diametrically opposed input and output portions. The crystal changes its refractive index when an electric field is applied to it. An electrically conductive mesh filter covers and is in electrical contact with input portion of the crystal. A first electrode is in electrical contact with the crystal on a side contiguous to the electrically conductive mesh filter. A second electrode is also in electrical contact with the crystal on a side both contiguous to the electrically conductive mesh filter and non-contiguous to the first electrode. The first electrode carries electrical voltage to the crystal. The electrical voltage exits the crystal and passes through the second electrode to a voltage source.

DETAILED DESCRIPTION OF THE DRAWINGS

The above and further advantages of the present invention may be understood by referring to the following description in conjunction with the accompanying drawings in which corresponding numerals in the different figures refer to the corresponding parts in which:

FIG. 1 illustrates a first embodiment of the present invention;

FIG. 3 illustrates an electrical connection to a first embodiment of the present invention;

FIG. 9 illustrates wavelengths resulting from an embodiment of the present invention.

DETAILED DESCRIPTION OF THE INVENTION

Figure 2A:
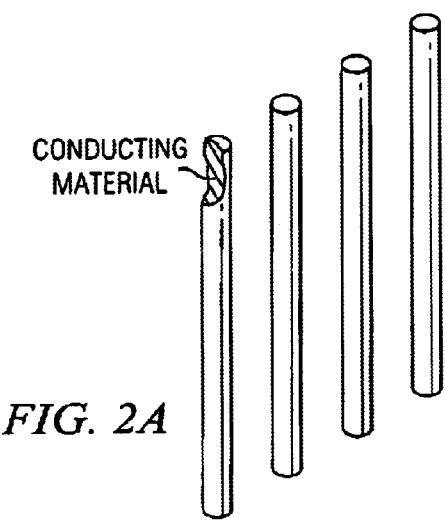
FIG. 2 illustrates various mesh filter designs in accordance with the present invention.
Figure 2B:
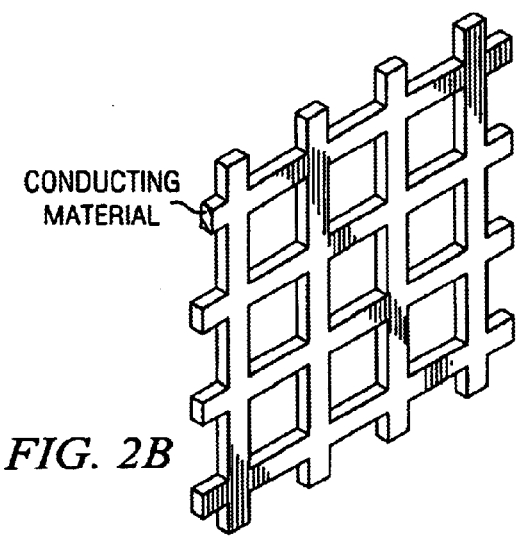

While the making and using of various embodiments of the present invention are discussed herein in terms of spectral filtering of light and/or radiation, it should be appreciated that the present invention provides many applicable inventive concepts that can be embodied in a wide variety of specific contexts. The specific embodiments discussed herein are merely illustrative of specific ways to make and use the invention and are not meant to limit its scope in any way. The following is a description of a tunable electro-optical device and method of the present invention that enable, for example, a scanning spectrometer. The method couples the spectral transmissivity produced by a metal mesh filter with the change of the refractive index of a crystal produced by electro-optical effects.

A first embodiment of the invention is illustrated in FIG. 1. Metal grid 11, including rectangular apertures spaced at regular intervals within a thin film of metal, and electrode 12, including a thin film of metal in which a hole is centered, are deposited each on opposing faces of electro-optic crystal 10. A metal grid with this general configuration, when operating in air, produces a very narrow transmission spectrum with peak transmissivity at a wavelength only slightly larger than the period of the grid. The exact spectral transmission curve produced by this type of device is very dependent upon the precise similarity between the apertures and upon the regularity of their spacing. With the spacing equal in the x and y directions, the grid will produce the same spectral transmission curve for input x and y polarized radiation. The width of the transmission spectrum is controlled by the size of the apertures. Smaller aperture result in narrower transmission spectrums.

When this type of grid is placed on a dielectric-like substrate, the location and width of the spectral transmissivity are changed. The line width is broadened slightly, and the peak transmissivity is shifted to a wavelength that is approximately the period of the grid times the refractive index of the substrate. With this in mind, it is clear that if either the period or the refractive index changes, the wavelength of peak transmissivity also changes.

The change in refractive index can be accomplished if the dielectric material is electro-optic (i.e., if the refractive index of the dielectric material changes when an electric field is applied to it).

An electro-optical crystal selected for use in the present invention includes materials that change optical properties when an electric field is applied. Like a capacitor, wherein a positive charge is placed on one plate (typically a metallic plate) and/or a negative charge is placed on the other plate, an electric field is developed between the mesh and the electrode. With the present device, an optical crystal is placed between the conductive mesh and the electrode (similar to an insulator of a capacitor). The charge induced between the mesh and the electrode on the optical crystal cause the optical signal present within the crystal to change as it passes through and exits the crystal. As known to one skilled in the semiconductor and optical arts, crystals are typically grown in a deposition chamber. They are grown to be of a certain thickness and type of material. The type of crystal material that would be used in the present invention can be of the type currently used within commercial electro-optic modulators.

Electro-optic crystals are usually anisotropic. Therefore, care must be taken to select a crystal such that the application of an electric field produces the same change in refractive index in both the x and y directions (as shown in FIG. 1). This, along with the equality of aperture spacing in the x and y directions, will insure that the device responds the same for both x and y polarizations. The index ellipsoid in the presence of an external electric field is given as:

$$\frac{1}{n_1^2}x^2 + \frac{1}{n_2^2}y^2 + \frac{1}{n_3^2}z^2 + 2\frac{1}{n_4^2}yz + 2\frac{1}{n_5^2}xz + 2\frac{1}{n_6^2}xy = 1$$

Assuming that the subscripts 1, 2, and 3 refer to the principle axes of the material, the $$\frac{1}{n^2}$$

terms with subscripts 4, 5 and 6 are zero in the absence of an external electric field. The relationship between the change in the $$\frac{1}{n^2}$$

terms and the applied electric field is given by:

$$\begin{bmatrix} \Delta\left(\frac{1}{n^2}\right)_1 \\ \Delta\left(\frac{1}{n^2}\right)_2 \\ \Delta\left(\frac{1}{n^2}\right)_3 \\ \Delta\left(\frac{1}{n^2}\right)_4 \\ \Delta\left(\frac{1}{n^2}\right)_5 \\ \Delta\left(\frac{1}{n^2}\right)_6 \end{bmatrix} = \begin{bmatrix} r_{11} & r_{12} & r_{13} \\ r_{21} & r_{22} & r_{23} \\ r_{31} & r_{32} & r_{33} \\ r_{41} & r_{42} & r_{43} \\ r_{51} & r_{52} & r_{53} \\ r_{61} & r_{62} & r_{63} \end{bmatrix} \begin{bmatrix} E_x \\ E_y \\ E_z \end{bmatrix}$$

For a field in the z direction, the goal is to produce an equal change in the refractive index for polarizations in both the x and y directions (alternatively, the 1 and 2 directions), it is noticeable that $r_{13}=r_{23}$ is required if the field were applied in the z direction only. This requirement is satisfied by three crystal structures: (1) tetragonal of the 4- and 4 mm-types; (2) triagonal of the 3-, 32- and 3 m-types; and (3) hexagonal of the 6- and 6 mm-types.

Using one of the above crystal types, the change in $$\frac{1}{n^2}$$

can be approximated as:

$$\Delta\frac{1}{n_i^2} \approx -2\frac{\Delta n}{n^3} = r_{i3}E_z,$$

where i=1 or 2.

The resulting change in refractive index caused by the application of a z-directed electric field is, therefore, $$\Delta n \approx \frac{-n^3 r_{13} E_Z}{2}$$

With the above relationships in mind, the field strength required to scan the narrowband transmission filter across the spectral region can be estimated to be from about 0.45 micrometers to about 0.8 micrometers for a selected material. Assuming that barium titanate used, the required electric field strength would be about $3 \times 10^8$ V/m. This would require a very large voltage unless the sample was quite thin. If the sample were on the order of 10 micrometers thick, the requisite applied voltage would be about 3 kV.

An appropriate mesh design can perform the spectral filtering function. The mesh should be capable of producing an extremely narrow bandwidth for most applications, and would be one of the easier mesh filters to produce. However, other designs are possible that produce a dual spectral transmission profile (i.e. a spectral profile with two narrow peaks). If one of the these types of meshes could be designed so that one bandpass could be positioned at the shortest wavelength desired, and the second bandpass at about mid-wavelength, then the short wavelength part of the scan and the longer wavelength portion could be performed simultaneously. The obvious problem with this approach is that it might be difficult to separate the two signals on the detector; however, the voltage required should be less as would the required time for the scan.

Mesh 11 performs two (2) functions in the invention. One function is the actual filtering operation. The second function of the metal mesh is to act as an electrode. Since the mesh is almost a continuous film of metal, the voltage could be applied directly to the mesh, thereby negating the need for any further electrical connections.

Metal grid structures have been used as spectrally selective components in a variety of microwave, millimeter and sub-millimeter wave, and far-infrared devices for many years. Three different mesh filters were used for ground based millimeter wave astronomical measurements, while metal meshes were used as spectral filters in a far-infrared and sub-millimeter wavelength satellite radiometer. In order to obtain spectrally resonant devices that have bandpass or bandstop characteristics in the middle infrared, conducting dipoles (or alternatively, slots in a conducting film) are required that range in length from approximately 1.0 to 4.0 $\mu$m. Precision line width or slot width control is required for accurate spectral bandwidth control. Microlithographic fabrication techniques have been developed that are capable of producing line widths less than 0.25 $\mu$m in thin films of aluminum. The successful fabrication of resonant inductive meshes resulted from the use of a metal-on-polymer process that essentially imitated a high resolution, negative tone electron-beam resist.

FIG. 2 illustrates schematically three different types of grids or meshes. Configurations (A) and (D) show grids of parallel conductors with circular and rectangular cross sections, respectively. The responses of grids (A) and (D) depend upon the polarization of the incident wave. An incident wave whose electric field is polarized parallel to the conductors induces currents along those conductors. The magnetic field that surrounds each conductor interacts with the currents in adjacent conductors, producing an "inductive" mesh. On the other hand, an electric field perpendicular to the conductors displaces free charges within the conductors, creating electric fields in the region between adjacent conductors in a manner similar to a capacitor. In this case the grid is called a "capacitive" mesh.

Configurations (B) and (C) of FIG. 2 illustrate two types of inductive meshes that are not polarization dependent, but which have different spectral responses. The inductive mesh of FIG. 2(B) consists of an array of crossed conducting wires and is referred to as a "high pass" filter, since the spectral transmittance increases from near zero for wavelengths much greater than the grid spacing (low frequencies) to near unity for wavelengths approaching the grid spacing (high frequencies). In contrast, the inductive mesh of FIG. 2(C), consisting of an array of crossed slots, is termed an inductive resonant mesh and exhibits a bandpass spectral transmittance, with the peak transmittance occurring when the wavelength is twice the length of each slot (if the mesh is surrounded by free space). Configurations (E) and (F) of FIG. 2 illustrate two types of meshes that are complementary to those of (B) and (C). Complementary meshes are those in which the regions of conducting material and open areas are interchanged. These meshes are termed capacitive since current flow is interrupted by gaps in the conducting material. The mesh in FIG. 2(E) is referred to as a "low pass" filter, since the spectral transmittance decreases from a value near unity for wavelengths much greater than the grid spacing to a near zero value for wavelengths that approach the grid spacing. The mesh shown in FIG. 2(F), composed of an array of metal crosses, is a capacitive resonant mesh that exhibits a bandstop transmittance property, having a zero transmittance for a wavelength that is twice the length of each cross arm (if suspended in free space) and a high transmittance for much longer or much shorter wavelengths.

All of the configurations shown in FIG. 2 act as diffraction gratings for wavelengths less than the grid spacing. The general spectral properties described here pertain to the case of normally incident plane wave radiation with wavelengths that exceed the grid spacing. In these instances, all diffracted orders (both in transmission and reflection) are evanescent except for the zeroth or specular order. It is clear from FIG. 2 that capacitive meshes are not self-supporting, but must be supported on a transmissive substrate.

Capacitive resonant meshes of aluminum and gold have been fabricated on several infrared transmitting substrates using a single resist lift-off metallization technique. This technique allows metallization after resist exposure and development and makes use of the property that an undercut profile results due to both electron scattering within the resist and back scattering from the substrate material.

In principle, the fabrication of inductive resonant meshes could proceed in a manner identical to that for capacitive meshes if a negative electron-beam resist were substituted for the positive resist PMMA. As an alternative to the use of a negative resist, the metal-on-polymer process can be used in combination with PMMA to invert the polarity of the exposed PMMA, thereby creating a high resolution negative tone mask.

Figure 2C:
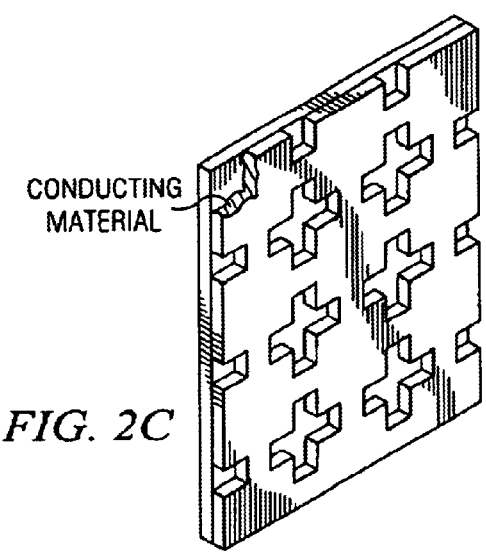
Figure 2D:
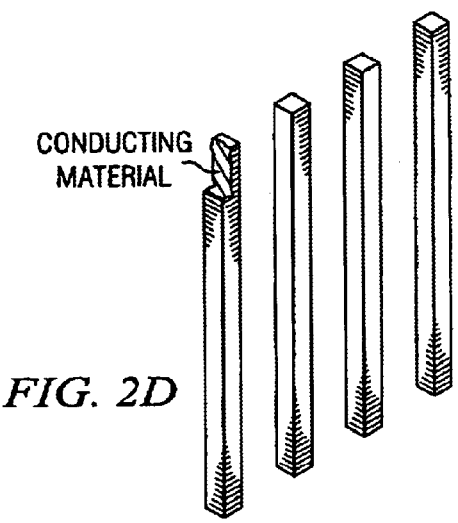
Figure 2E:
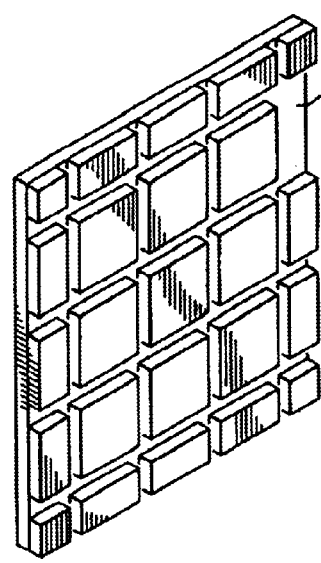
Figure 2F:
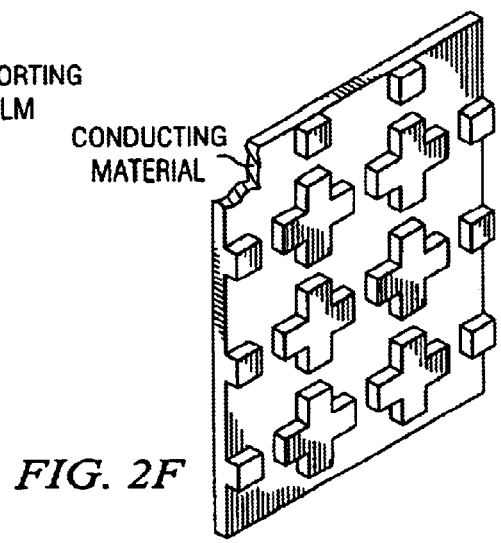

Inductive resonant meshes similar to the one shown in FIG. 2(C) have also been fabricated on calcium fluoride, zinc selenide, and germanium substrates. Line widths (slots in otherwise continuous films of aluminum and gold) varying from 0.3 $\mu$m to less than 0.2 $\mu$m have been obtained.

Resonant capacitive mesh filters have been fabricated by combining electron-beam lithography to pattern PMMA with a lift-off technique. Direct electron-beam patterning of PMMA followed by metallization and lift-off successfully created capacitive mesh patterns having line widths less than 0.25 $\mu$m in 0.1 $\mu$m thick aluminum and gold. The optical performance of a resulting resonant capacitive mesh was measured and found to produce the bandstop transmittance feature that was expected. Resonant inductive mesh filters have been fabricated using a metal-on-polymer process to create a negative tone mask. In this two level process, a layer of polyimide was first applied to the substrate followed by deposition of a capacitive metal mesh pattern on top of it. This pattern was transferred to the polyimide by oxygen RIE. The resulting resonant inductive mesh patterns had linewidths less than 0.25 μm and produced the distinctive bandpass transmittance property in the middle infrared spectral region.

Referring to FIG. 3, electrical connection to mesh 11 and electrode 12 includes access to variable voltage source 43 that is tunable in magnitude through plural voltages, perhaps from 0 up to 1,000 volts or more, connected to mesh 11 and electrode 12. Connection can be through discreet wires or contacts 41 and 42, or through contacts integrated directly on a microchip wherein the mesh and crystal may be co-located on a substrate. The variable voltage feed to the mesh and crystal can be controlled through a controller or microprocessor.

Figure 4:
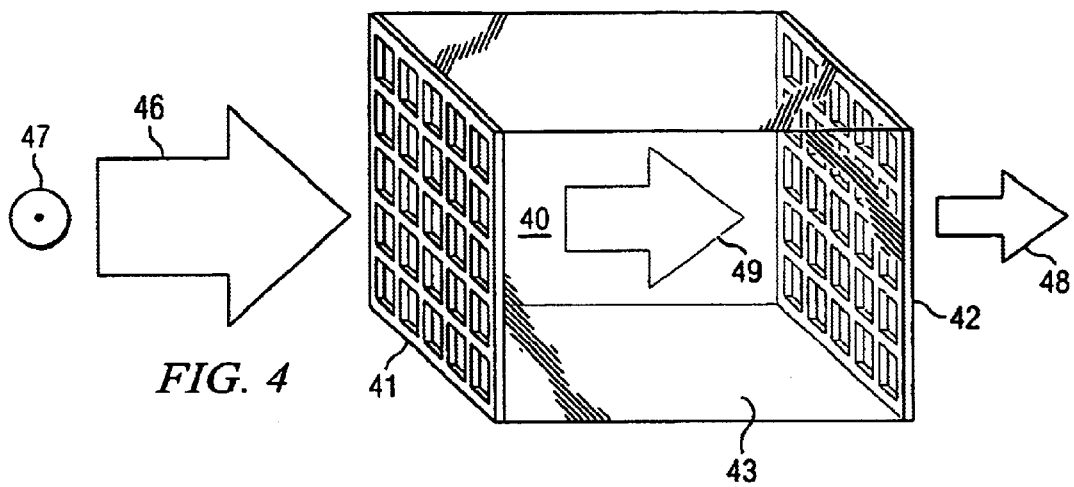
FIG. 4 illustrates the operation of a first embodiment of the present invention.

Referring to FIG. 4, during operation, tunable filter 40 receives light signal 46 from source 47. Light signal 46 enters mesh filter 41 where the properties are changed. Mesh 41 filters light signal 46. Filtered light signal 46 passes through electro optic crystal 43 and then exits through electrode 42. Light signal 48 that exits the device is a spectrally very narrow region, partially representative of what initially entered the device (e.g., a broad band optical signal coming in would be filtered so the signal exiting the device is a narrow band optical signal). The electrical influence on the crystal allows the bandpass to be tunable. The crystal, thereby, tunes the location of the narrow spectral band.

In a mesh filter without a crystal, the light would go through the mesh and be filtered. The position of a wavelength of a signal can be tuned over many different positions through the crystal. The voltage on the crystal is what causes the shifting. The broad band optical signal goes through, is filtered through the mesh, hits the electro optical crystal and, because of the voltage applied to the crystal, is shifted. The signal then exits through the electrode. The signal resulting from the invention is a narrow band signal that has been filtered and shifted dependent on the electro-optical crystal's influence.

By adding a variable voltage device to the present invention, electrical voltage contacting the crystal causes variable wavelength values to be produced. The voltage applied can be continuous (in which case you would have a continuous shift), or a digital voltage where it would either be on or off (shifting between two predetermined positions). The present invention can also be used in a multiplexing capacity. Several signals can be processed through the optical filter simultaneously. For example, in today's semiconductor or optical communications technology, modulation of the signal carrying the information is accomplished by internally modulating the laser. The light signal emitted is pulsed.

Figure 5:
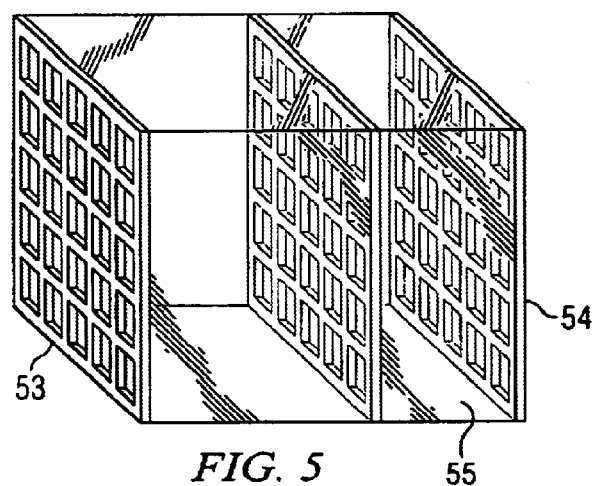
FIG. 5 illustrates a second embodiment of the present invention.

Referring to FIG. 5, by adding a second mesh filter 54 to the tunable optical filtering device as shown in FIG. 1, multiple signals can be processed at diverse frequencies. Following the electro-optical device by another filter, various signal processing and multiplexing applications can be met. The subsequent filter could be created using a similar mesh design as in the case of the first mesh 53. Second mesh filter 54 would be a single mesh having some form of support (in accordance with mesh designs as discussed above). Optical material can be used to support the mesh. Supporting optical material 55 would be chosen to have a negligible effect on the passing signal, unlike the electro-optical crystal.

Figure 6A:
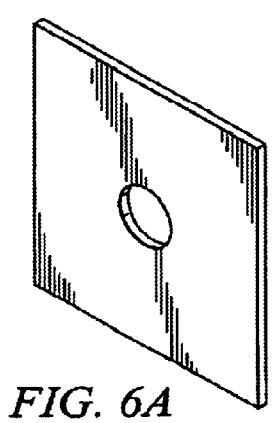
FIG. 6 illustrates various electrode designs in accordance with the present invention.
Figure 6B:
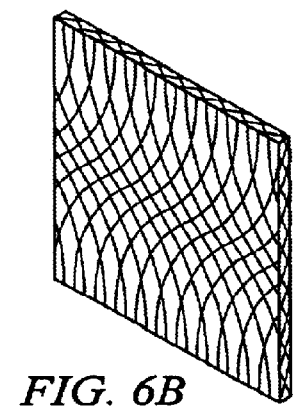

FIG. 6 illustrates two (2) representative configurations of an electrode for use with the embodiments of FIGS. 1 and 5. Electrode (A) includes a thin metal sheet with a centered hole. In addition, Electrode (A) could include a semi-transparent conductive film. Electrode (B) includes a transparent electrode. The construction of a transparent electrode includes the use of a continuous solid thin film having metallic properties, thus enabling it to interact with light.

Figure 7:
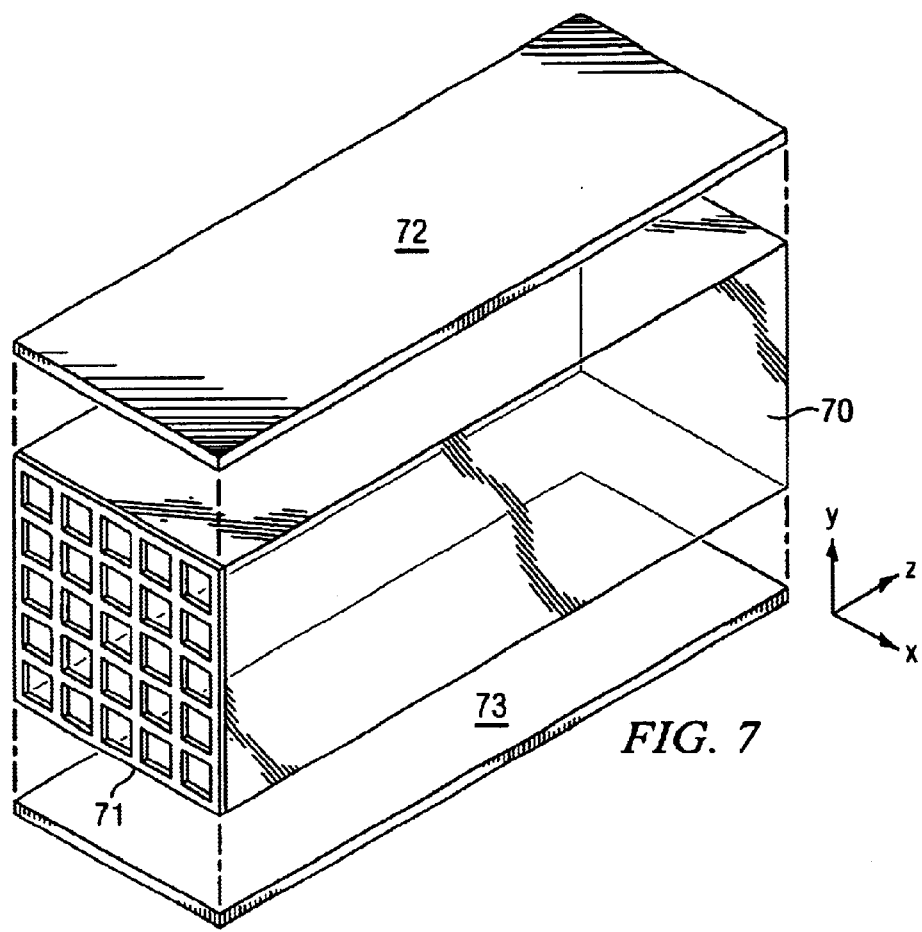
FIG. 7 illustrates a third embodiment of the present invention.

FIG. 7 illustrates a third embodiment of the present invention. Metal grid 71, including rectangular apertures spaced at regular intervals within a thin film of metal is deposited on a face of electro-optical crystal 70. Light will be transmitted along the z-axis, through metal grid 71 and exit through the opposite end of electro-optical crystal 70. Electrode 72 is placed on any remaining side of electro-optical crystal 70 other than the side opposite metal grid 71. Electrode 73 is placed on any face that is opposing and non-contiguous to the face on which electrode 72 has been placed.

Figure 8:
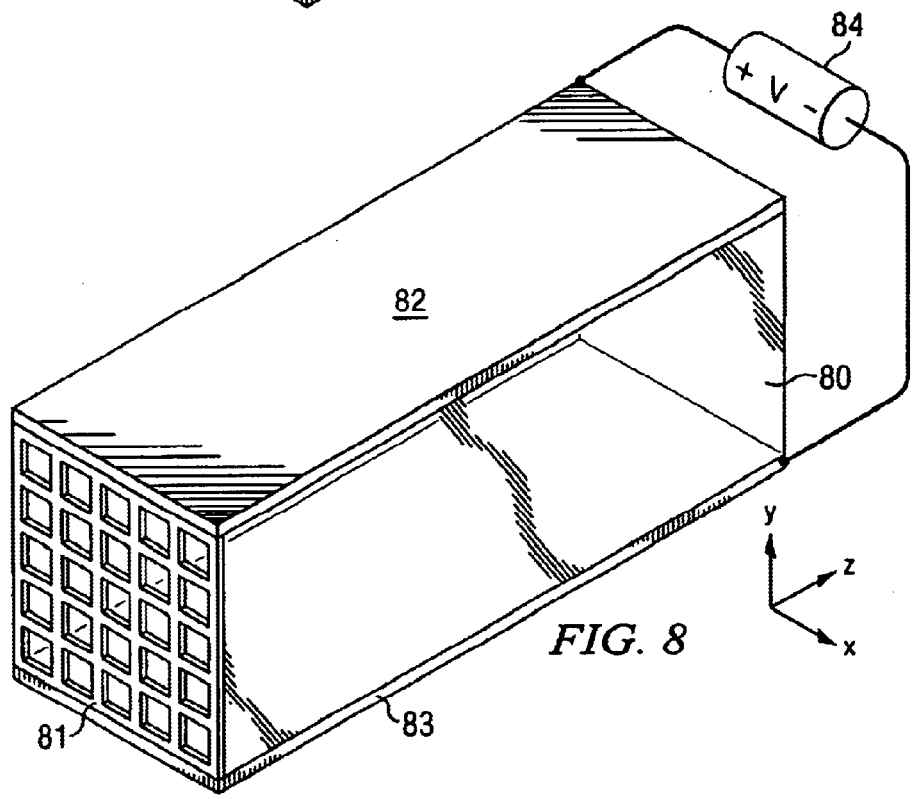
FIG. 8 illustrates an electrical connection to a third embodiment of the present invention.

FIG. 8 illustrates an electrical connection to FIG. 7. Electrical connection to electrode 82 and electrode 83 includes access to variable voltage source 84 that is tunable in magnitude through plural voltages, perhaps from 0 up to 1,000 volts or more, connected to electrode 82 and electrode 83. Light will be transmitted along the z-axis, through metal grid 81 and exit through the opposite end of electro-optical crystal 80. An electro magnetic field will be created along the y-axis.

FIG. 9 illustrates wavelengths resulting from an embodiment of the present invention as shown in FIG. 5. Wavelength 91 is the resultant wave from the present invention as shown in FIG. 1, the tunable filter. Wavelength 92 is the resultant wave from fixed filter 54 of FIG. 5. The combination results in light pulses. A signal is only received when wavelength 91 lines up with wavelength 92 as shown in the combinations of points (B)+(D) and (C)+(E). Point (A) does not line up with a point on wavelength 91. Therefore, no signal would be received at that point in time.

The invention can be utilized in a variety of applications from communications to medical and chemical labs. For example, spectrometers have been used widely in chemical labs. These spectrometers provide sensors to analyze, for example, liquids held within a container. Typically, light would be shined through a liquid and put in a special vial. The spectrometer would measure the absorbed wavelength. Within the aerospace industry, satellites may incorporate the invention to measure properties of the earth's surface or atmosphere. The invention can collect radiation emitted by chemicals that are being studied by detecting wavelengths of radiation that are characteristic of the emission of those chemicals (gases).

While specific alternatives to the present invention have been described herein, additional alternatives not specifically disclosed but known in the art are intended to fall within the scope of this invention. Thus, it is understood that other applications of the present invention will be apparent to those skilled in the art upon the reading of the described embodiments and a consideration of the appended claims and drawings.

What is claimed is:

1. A tunable electro-optical filter, comprising:
   an electro-optical crystal having an input portion and an output portion, the output portion diametric to the input portion, wherein the electro-optical crystal changes its refractive index when an electric field is applied to it;
   an electrode in electrical contact with the output portion of the electro-optical crystal; and an electrically conductive mesh structure adapted to filter a received optical signal in order to provide a filtered optical signal of selected narrow passband to the input portion of the electro-optical crystal, said mesh structure further adapted to cooperatively act with the electrode to apply an electric field to the electro-optical crystal.

2. The tunable electro-optical filter of claim 1 wherein optical properties of the electrically conductive mesh structure arc determined partially by the refractive index of the electro-optical crystal when a voltage is applied to the electrically conductive mesh structure and the electrode to apply said electric field.

3. The tunable electro-optical filter of claim 1 wherein the refractive index of the electro-optical crystal can be varied with variations of said applied electric field, in order to correspondingly vary the spectral position of an optical output signal provided by said electro-optical crystal in response to said input filtered optical signal of said selected narrow passband.

4. The tunable electro-optical filter of claim 2 wherein a voltage source is in electrical contact with the electrically conductive mesh structure and the electrode to apply said voltage thereto.

5. The tunable electro-optical filter of claim 4, wherein the voltage source is variable to tune said filter by selectively varying said applied electric field.

6. The tunable electro-optical filter of claim 1 wherein a thin film coating is applied to the electro-optical crystal.

7. The tunable electro-optical filter of claim 6, wherein the electrode comprises a semi-transparent conductive film.

8. The tunable electro-optical filter of claim 6, wherein the electrode is comprised of a thin metal sheet with a centered opening through which the optical beam passes.

9. The tunable electro-optical filter of claim 1 further comprising a second electrically conductive mesh filter covering the electrode.

10. A tunable electro-optical filter, comprising:
    a single electro-optical crystal having an input portion and an output portion, the output portion diametric to the input portion, wherein the electro-optical crystal changes its refractive index when an electric field is applied to it;
    an electrode covering and in electrical contact with a selected one of said portions of the electro-optical crystal; and
    electrically conductive material arranged to form a grid pattern on the non-selected one of said portions of the electro-optical crystal, said grid pattern adapted to filter a received wide band optical signal to provide a filtered optical signal of selected narrow passband, said grid pattern further adapted to cooperatively act with the electrode to apply an electric field to the electro-optical crystal.

11. The tunable electro-optical filter of claim 10 wherein:
    the grid pattern is provided with an array of spaced apart rectangular apertures, the width of the transmission spectrum produced by the grid pattern being determined by the size of respective apertures, and the spacing between apertures being the same along each of two orthogonal axes.

12. The tunable electro-optical filter of claim 10 wherein:
    the grid pattern is provided with an array of apertures and is operated as an inductive mesh filter.

13. The tunable electro-optical filter of claim 10 wherein:
    the grid pattern comprises an array of spaced apart elements of said conductive material and is operated as a capacitive mesh filter.

14. A method of producing a narrow band optical signal from a wider band optical signal, comprising;
    placing a mesh formed of electrically conductive material and configured to operate as an optical filter on a first face of an electro-optical crystal;
    projecting the wider band optical signal through the mesh so that the wider hand signal is filtered by the mesh to produce the narrow band optical signal, and the narrow band signal is applied to the first face of the electro-optical crystal as the input thereto; and
    applying a voltage to the mesh and to an electrode located on a second face of the electro-optical crystal diametric to the first face to select the spectral position of the narrow band optical signal when the narrow band signal is outputted from the electro-optical crystal.

15. The method of claim 14 wherein application of a voltage between the mesh and the electrode creates a field internal to the electro-optical crystal that changes the refractive index thereof, and causes the electro-optical crystal to selectively tune the narrow band optical signal.

16. The method of claim 14 wherein the voltage applied to the electro-optical crystal is variable.

17. A tunable electro-optical filter, comprising:
    an electro-optical crystal having an input portion and an output portion, the output portion diametric to the input portion, wherein the electro-optical crystal changes its refractive index when an electric field is applied to it, the electro-optical crystal being further provided with first and second sides in diametrically opposing relationship with each other, both of said sides extending between the input and output portions of the electro-optical crystal;
    an electrically conductive mesh filter covering and in electrical contact with the input portion of the electro-optical crystal, wherein the electrically conductive mesh filter is adapted to filter a received optical signal and to provide an input signal of selected narrow passband;
    a first electrode covering and in electrical contact with said first side of the electro-optical crystal and contiguous to the electrically conductive mesh filter;
    a second electrode covering and in electrical contact with said second side of the electro-optical crystal, contiguous to the electrically conductive mesh filter and diametric to the first electrode; and
    a voltage source in electrical contact with the first electrode and the second electrode.

18. The tunable electro-optical filter of claim 17 wherein the voltage source is variable.

19. The tunable electro-optical filter of claim 17 wherein a thin film coating is applied to the electro-optical crystal.

20. The tunable electro-optical filter of claim 17 wherein the first electrode and the second electrode each comprises a conductive continuous solid thin film.

21. The tunable electro-optical filter of claim 17 wherein the first electrode and the second electrode each comprises a thin metal sheet.

* * * * *